US008692650B2

(12) United States Patent
Pöllabauer

(10) Patent No.: US 8,692,650 B2
(45) **Date of Patent: *Apr. 8, 2014**

(54) ACCESS CONTROL DEVICE

(75) Inventor: Reinhard Pöllabauer, Vienna (AT)

(73) Assignee: EVVA-WERK Spezialerzeugung von Zylinder- und Sicherheitsschlossern Gesellschaft m.b.H. & Co. KG, Vienna (AT)

( * ) Notice: Subject to any disclaimer, the term of this patent is extended or adjusted under 35 U.S.C. 154(b) by 1038 days.

This patent is subject to a terminal disclaimer.

(21) Appl. No.: 12/226,891

(22) PCT Filed: Mar. 22, 2007

(86) PCT No.: PCT/AT2007/000140
§ 371 (c)(1),
(2), (4) Date: Oct. 31, 2008

(87) PCT Pub. No.: WO2007/128009
PCT Pub. Date: Nov. 15, 2007

(65) Prior Publication Data

US 2009/0096577 A1 Apr. 16, 2009

(30) Foreign Application Priority Data

May 4, 2006 (AT) .................................. A 768/2006

(51) Int. Cl.
*G05B 19/00* (2006.01)

(52) U.S. Cl.
USPC ......... 340/5.61; 340/5.64; 340/5.7; 340/5.74; 340/5.8; 340/5.81; 340/5.82

(58) Field of Classification Search
CPC ................. G07C 9/00182; G07C 2009/00761; G07C 2009/00777; G07C 9/00103; G07C 9/00309; G07C 9/00896; G07C 9/00111; E05B 49/006; E05F 15/2076; H04W 12/06; G06F 21/36
USPC ............... 340/5.64, 5.7, 5.61, 5.74, 5.8, 5.81, 340/5.82
See application file for complete search history.

(56) References Cited

U.S. PATENT DOCUMENTS 3,824,817 A * 7/1974 Orr .................................. 70/81
4,274,080 A * 6/1981 Brunken ...................... 340/5.23

(Continued)

FOREIGN PATENT DOCUMENTS

CN 1428737 A 7/2003
DE 37 35 470 A1 5/1989

(Continued)

*Primary Examiner* — George Bugg
*Assistant Examiner* — Paul Obiniyi
(74) *Attorney, Agent, or Firm* — Taft Stettinius & Hollister LLP

(57) ABSTRACT

In an access control device including a lock (2) with a locking element, an actuating element (3) for the locking element, an electronic key (5), an electrical circuit including a receiver unit for receiving key identification data and an evaluation circuit for determining access authorization based on the received identification data, the evaluation circuit cooperates with the actuating element (3) and/or the locking element for selectively locking or unlocking the lock (2). The electronic key (5) comprises means for generating a capacitive near field via which the identification data is emitted. Furthermore, a device for coupling the capacitive near field to the person (4) carrying the key (5) is provided, wherein the receiver unit of the lock (2) comprises at least one capacitive coupling surface such that an alternating current circuit closes at a contact of the lock (2), or an approach of the lock (2), by said person (4) and an electric flux is created across the lock (2), which can be detected by the receiver unit.

14 Claims, 4 Drawing Sheets

(56) References Cited

U.S. PATENT DOCUMENTS

| | | | | |
|---|---|---|---|---|
| 4,862,139 | A * | 8/1989 | Fukamachi et al. | 340/426.35 |
| 5,043,593 | A * | 8/1991 | Tsutsumi et al. | 307/10.2 |
| 5,625,349 | A * | 4/1997 | Disbrow et al. | 340/5.25 |
| 6,181,025 | B1 * | 1/2001 | McConnell et al. | 307/10.2 |
| 6,380,842 | B1 * | 4/2002 | Mattes et al. | 340/5.25 |
| 6,549,115 | B1 * | 4/2003 | Daiss et al. | 340/5.31 |
| 6,798,336 | B2 * | 9/2004 | Kanda et al. | 340/5.61 |
| 6,967,562 | B2 * | 11/2005 | Menard et al. | 340/5.64 |
| 7,543,755 | B2 * | 6/2009 | Doi et al. | 235/492 |
| 2002/0017978 | A1 * | 2/2002 | Kanda et al. | 340/5.61 |
| 2003/0122651 | A1 | 7/2003 | Doi et al. | |
| 2003/0128116 | A1 * | 7/2003 | Ieda et al. | 340/562 |
| 2004/0160126 | A1 * | 8/2004 | Aoki et al. | 307/10.2 |
| 2006/0071755 | A1 * | 4/2006 | Muller et al. | 340/5.72 |
| 2007/0115094 | A1 | 5/2007 | Gillert et al. | |

FOREIGN PATENT DOCUMENTS

| | | | | |
|---|---|---|---|---|
| DE | 10 2004 004 376 | A1 | 3/2006 | |
| DE | 10 2004 048 956 | A1 | 4/2006 | |
| EP | 1 168 678 | A1 | 1/2002 | |
| EP | 1 235 190 | A1 | 8/2002 | |
| EP | 1 239 420 | A1 | 9/2002 | |
| EP | 1239420 | A1 * | 9/2002 | |
| EP | 1 783 694 | A1 | 5/2007 | |
| WO | WO 9741322 | A1 * | 11/1997 | E05B 49/00 |
| WO | WO 2005/088559 | A1 | 9/2005 | |
| WO | WO 2006/021592 | A1 | 3/2006 | |

* cited by examiner

ACCESS CONTROL DEVICE

The invention relates to an access control device including a lock with a locking element, an actuating element for the locking element, an electronic key, an electrical circuit including a receiver unit for receiving key identification data and an evaluation circuit for determining access authorization based on the received identification data, said evaluation circuit cooperating with the actuating element and/or the locking element for selectively locking or unlocking the lock.

In the following, electronic keys are meant to encompass various configurations and, in particular, cards, key rings or chains, and combinations of mechanical and electronic keys.

Access control devices of the initially defined kind have become known in various configurations. Thus, radio remote-controlled locks are, for instance, known, in particular for locking and unlocking car doors, wherein a mobile electronic key is provided to send identification data via a radio link to a receiver of the lock, optionally in encoded form. The lock has an electric circuit for evaluating and optionally decoding the received information, whereby the lock is actuated as soon as the access authorization has been determined based on the received identification data. Besides such radio remote-controlled locks, there are also access control systems using transponder keys. For actuating the lock, the transponder key merely has to be brought to a few centimeters near a transmitter-receiver unit of the lock, where the identification data stored in the transponder key is read out inductively.

Furthermore, so-called "human area networks (HAN)" have become known, in which the skin of the person carrying an electronic device is used as a transmission medium for the exchange of data between at least two electronic devices. Data transmission in this case is not effected via electromagnetic waves or light, but via weak electric fields generated on the skin surface. This is also called a capacitive near field, wherein, as a rule, a transmitter generating a capacitive near field and means for coupling the near field to the skin of the respective person are provided. The data modulated onto the electrical field are subsequently received by a receiver and evaluated accordingly.

The present invention aims to simplify the handling of the access control and to improve conventional access control systems so as to provide increased safety, reduce chances of manipulation by unauthorized persons, prevent maloperations as well as enhance reliability, user-friendliness and durability.

To solve this object, the access control device of the initially defined kind is essentially further developed such that the electronic key comprises means for generating a capacitive near field via which the identification data is emitted, and a device for coupling the capacitive near field to the person carrying the key, and that the receiver unit of the lock comprises at least one capacitive coupling surface such that an alternating current circuit closes at a contact of the lock, or an approach of the lock, by said person and an electric flux is created across the lock, which can be detected by the receiver unit. Due to the fact that the transmission of the identification data is effected from the electronic key to the lock by the aid of a capacitive near field, the electronic lock itself need not be brought into the immediate vicinity of the receiver of the lock, and no separate activation of the key, for instance by touching a button, is required. It will rather do for the electronic key to be near the body of the respective user, for instance in a trouser pocket, briefcase or the like, whereby the emission and transmission of the identification data are effected via a capacitive near field which is coupled to the body surface of the respective user by the electronic key. As soon as the person carrying the key approaches a capacitive coupling surface of the lock, or touches the coupling surface or some part conductively connected with the coupling surface, the data transmission itself takes place from the transmitter of the key to the receiver of the lock via the capacitive near field, thus causing an alternating current circuit to close and induce an electric flux across the lock, which can be detected by the receiver unit. The identification data may, for instance, be modulated onto a carrier frequency generated by the electronic key.

The user-friendliness of the access control when unlocking a lock is thus substantially enhanced while, at the same time, ensuring that data transmission will only be effected if the person carrying the key approaches the lock or touches the same, so that manipulations by third parties will almost be excluded. Due to the fact that, according to the invention, a low-energetic capacitive near field is applied, the energy consumption of the access control system and, in particular, the power consumption of the electronic key are, moreover, extremely low. In the main, extremely small currents are created by the capacitive near field, which, even when transmitted via the user's skin, are completely safe for the human organism.

The retrofitting of existing locks will be facilitated in that the lock plus fittings, operating handles or knobs and the like includes all of the components required for receiving the identification data, evaluating the received data and actuating the locking member. An extremely compact mode of construction is thus ensured, and no external devices such as, e.g. reception antennas, are required, so that locks according to the invention can be substituted for existing access control systems without involving major expenditures.

In a preferred manner, it is provided that the receiver unit of the lock comprises at least two electrodes jointly forming a receiver capacitor. The electrodes of the receiver capacitor can, thus, be likewise integrated in the lock unit, with the precise arrangement of the two electrodes in the lock being dependant on the respective demands. As a rule, it will, however, be most advantageous if the electrodes of the receiver capacitor are arranged on a location within the lock, through which the major portion of the electric flux passes. The course of the electric flux through the lock depends on the precise structural configuration of the individual parts of the lock such as, e.g. the fitting, the operating handle or knob and the locking cylinder, as well as on the respective installation situation of the lock in the respective door. Depending on the concrete nature of the lock as well as the installation situation, more or less strong stray fields are formed such that it has to be taken care that the electrodes of the receiver capacitor be arranged on a location within the lock, through which the electric flux passes, so as to enable an alternating current circuit to close, for instance, via the door and the ground back to the electronic-key-carrying person, and the data exchange to occur.

For simply opening or locking a lock, a unidirectional data exchange from the electronic key to the lock will do. According to a preferred further development, a bidirectional data exchange is, however, provided, wherein a transmission device for transmitting data from the lock to the electronic key is provided. Such a back-channel from the lock to the key can, for instance, serve coding purposes and the transmission of additional data, which can subsequently be stored in the key to be transmitted back to the lock at the next opening procedure to follow. To this end, the transmission device preferably comprises means for generating a capacitive near field and for coupling said field to the person carrying the key. The transmission device in this case may again comprise at least two electrodes jointly forming a transmitter capacitor. In this respect, the configuration may be devised such that the electrodes of the receiver capacitor and the electrodes of the transmitter capacitor are designed to be independent of and separate from each other. However, in an advantageous manner, the configuration is devised such that at least one of the electrodes of the receiver capacitor at the same time also forms one of the electrodes of the transmitter capacitor. In this case, it is either feasible that a single electrode constitutes an electrode of the receiver capacitor and, at the same time, an electrode of the transmitter capacitor, with each condenser additionally having a further electrode, or that a total of only two electrodes alternately forming the receiver capacitor and the transmitter capacitor are provided.

There are various options to achieve a particularly beneficial arrangement of the electrodes within the lock. Thus, at least one electrode may, for instance, be arranged in the lock fitting, or designed as the lock fitting or part of the latter. With such an arrangement, the electrode is placed as closely to the user as possible such that the user merely needs to touch the fitting, or approach the fitting, in order to cause an opening of the door. In the event that a handle or actuating unit is provided for the lock, the device may preferably be further developed such that at least one electrode is arranged in the knob of the lock, or designed as a knob or part of the latter. A particularly compact configuration will result, if at least one electrode is arranged in the locking cylinder of the lock, or designed as a locking cylinder or part of the latter. Such a configuration allows for the complete dispensation of handle or actuating units for communication purposes on at least one side of the door and enables the complete integration of the receiver and/or transmitter unit in the lock or locking cylinder.

In the event that the receiver capacitor is to be provided completely within the knob, the configuration is preferably further developed such that both of the electrodes of the receiver capacitor are arranged on or in the knob of the lock, wherein, in a preferred manner, one electrode is arranged on, or forms, the outer surface of the knob and the other electrode is arranged on an inner surface of the knob, which is separated from the outer surface by an insulating layer.

In another preferred further development, it is provided that the actuating member, in particular a handle piece of the lock, is conductively connected with an electrode of the receiver capacitor, which electrode is arranged in the interior of the lock.

The electrical circuit of the access control device according to the invention can also be directly integrated in the lock, in which case it is preferably provided that at least one of the electrodes is conductively connected with the electrical circuit.

The concrete configuration of the electrodes can be realized in various ways, with a configuration being preferred in which at least one of the electrodes is designed as a conductive foil on a component of the lock. Instead of a conductive foil, it may also be provided that at least one of the electrodes is designed as a conductive coating, in particular varnish, of a component of the lock.

In the following, the invention will be explained in more detail by way of an exemplary embodiment schematically illustrated in the drawing. Therein, FIG. 1 is a schematic illustration of an access control device according to the invention;

Figure 1:
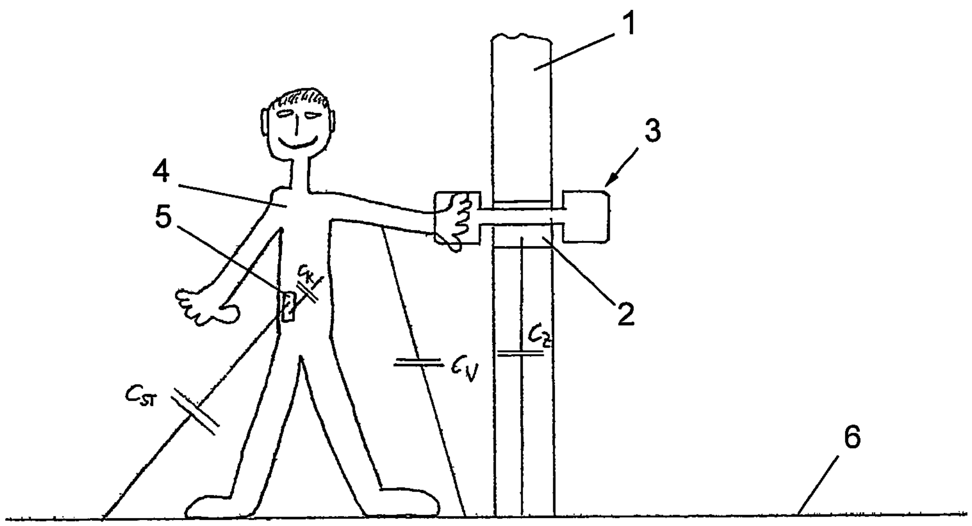

FIG. 1 schematically depicts a door with a person opening the door, as well as the individual stray, loss and coupling capacities. The door is denoted by 1 and comprises a lock 2 including an actuating member 3 which is designed as a knob. The person 4 carries an electronic key 5, which may, for instance, be placed in a trouser pocket. The electronic key produces a capacitive near field with a carrier frequency onto which identification data is modulated. The capacitive near field is coupled to the body surface of the person 4 and subsequently transmitted to a receiver of the lock 2. The electronic key 5 has a stray capacity Cst against the ground 6. On the transition between the electronic key 5 and the person 4, a coupling capacity Ck is to be observed. Furthermore, a dissipation capacity Cv occurs between the person 4 and the ground 6. Finally, the lock 2, or its cylinder, has a cylinder capacity Cz against the ground.

Figure 2:
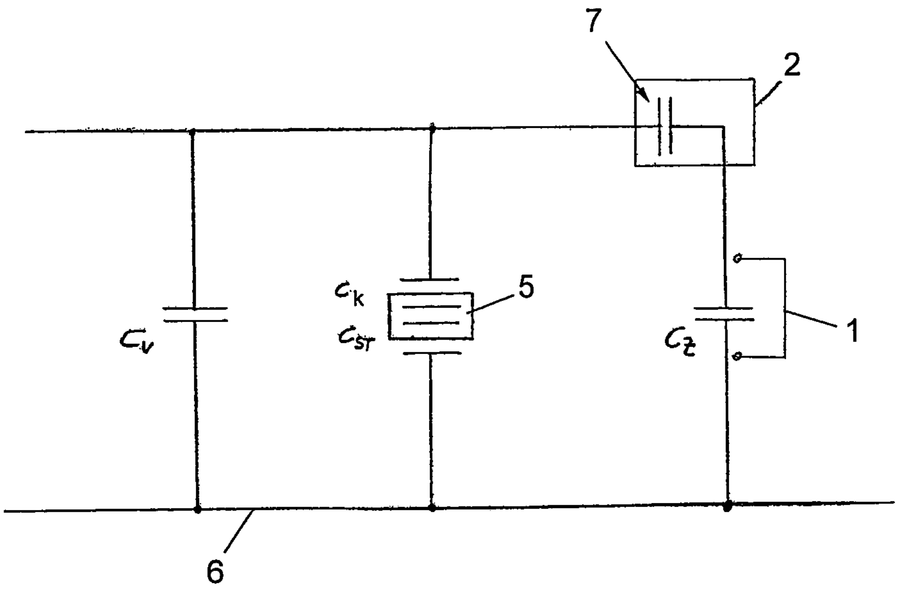
FIG. 2 is a simplified equivalent circuit diagram of the configuration according to FIG. 1.

The respective, simplified equivalent circuit diagram is illustrated in FIG. 2, with the described capacities being again indicated. Cv simulates all capacities, which result in electric fluxes that do not close from the transmitter via the receiver capacitor of the receiver, but rather pass by the same and, hence, do not contribute at all to the coupling between receiver and transmitter. Cst imitates the capacities which, in sum, are available for the capacitive coupling of the transmitter bottom electrode against ground. Ck imitates the capacities which, in sum, are available for the capacitive coupling of the person 4 to the second electrode. Cz imitates the capacities which, in sum, are available for the capacitive coupling from the lock or cylinder to the ground. In FIG. 2, the lock is again denoted by 2 and comprises a receiver capacitor 7. The receiver capacitor 7 is to be devised such that a sufficient electric flux will, on the one hand, close via the receiver capacitor and the voltage at the capacitor will, on the other hand, not become too small. If the capacity of the receiver capacitor is too small, too little electric flux will close via the same. Yet, also too large a capacity of the receiver capacitor is disturbing in that the voltage at the capacitor $u=q/c$ will become unfavorably small.

Figure 3:
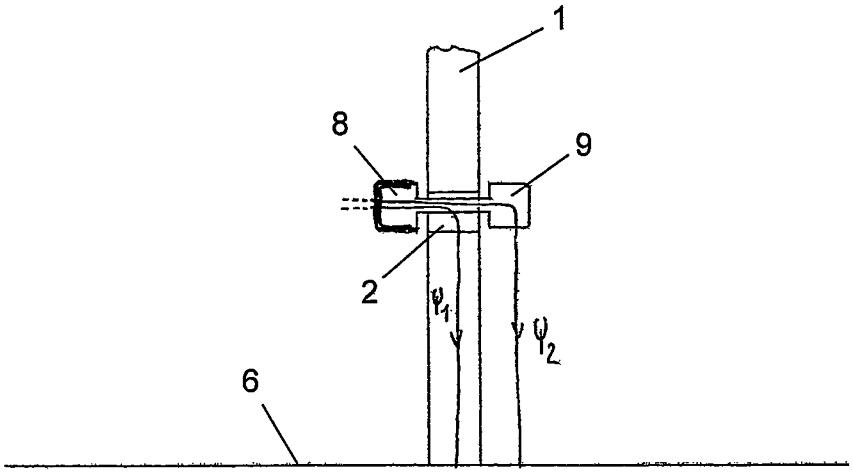
FIG. 3 shows the courses of electric flux in a configuration of the access control device according to the invention.

FIG. 3 schematically indicates electric fluxes at a door during the reception of identification data of the electronic key. The receiver capacitor in this case is arranged on the outer side of the lock, i.e. on or in the knob 8, which results in a better electrical coupling between the transmitter of the electronic key 5 and the receiver in the lock 2. To actuate the lock, it will do, if a person 4 carries the electric key on the body and touches the external knob 8. In doing so, the identification data will at the latest be conveyed upon contact of the external knob 8. Sufficient capacitive coupling, e.g. between the person's hand and the external knob 8, may also enable the transmission of the data by such coupling even before touching the knob 8. From FIG. 3, it is apparent that, due to the arrangement of the electrodes of the receiver capacitor on the outer side of the door, i.e. on the external knob 8, the electric fluxes forming can be utilized in a particularly advantageous manner for the reception of the identification data. Therein, $\psi$1 denotes the electric flux running from the external knob 8 through the lock 2 and the door 1 to the ground 6. $\psi$2 denotes the electric flux running from the external knob 8 through the lock 2 to the internal knob 9 and to the ground 6. Moreover, an electric flux $\psi$3 occurs, which is not shown and represents the sum of all strays downstream of the receiver capacitor, which have run through the receiver capacitor and do not close towards the transmitter via the path of $\psi$1 or $\psi$2, but via the plurality of possible other paths.

Figure 4:
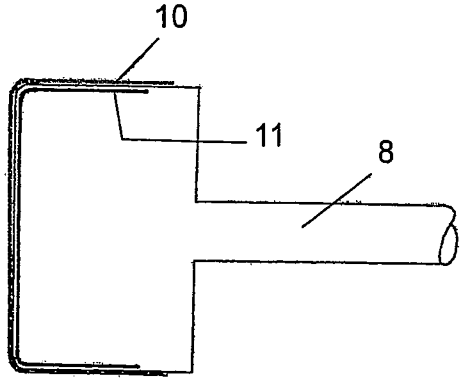
FIGS. 4 to 8 illustrate modified configurations of the access control device.

FIG. 4 is an enlarged view of the external knob 8 according to FIG. 3. On the outer side of the external knob 8 an electrode 10, and in its interior an electrode 11, of the receiver capacitor 7 are illustrated. Each of the two electrodes may be formed of massive metal, a metal foil, as a coating, varnish, or in any other way. Thus, the electrode 10 may, for instance, be comprised of a coating while the electrode 11 is formed by a metal can, or likewise by a coating applied on the inner side of the knob 8. The internal electrode 11 and the external electrode 10 may be differently dimensioned. Either the whole knob 8 or only a part of the knob periphery may each serve as an electrode. The electrical circuit including the receiver unit for receiving identification data and an evaluation circuit for determining the access authorization may be arranged on any location within the lock 2. If required, the electrical circuit must be connected with the electrodes by the aid of one or several lines leading through the lock.

Figure 5:
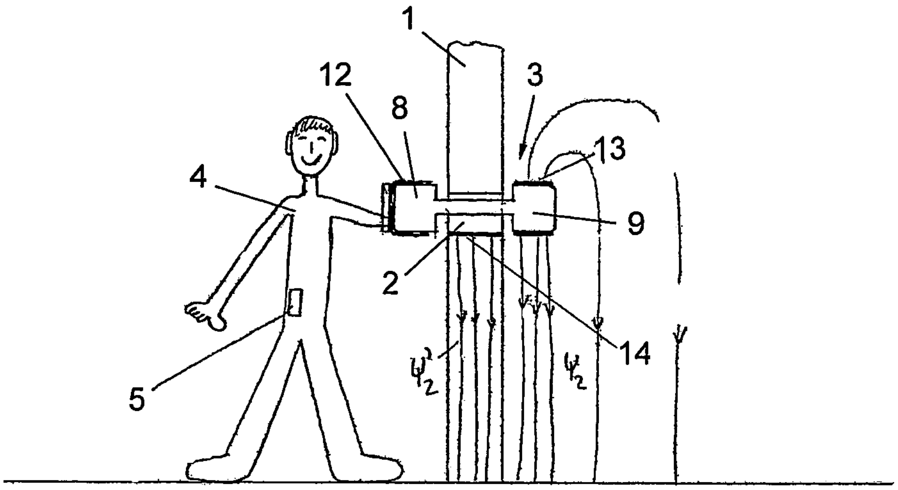

FIG. 5 illustrates an electrode array which is particularly suitable for sending data from the lock 2 back to the electronic key 5. The electrode 12 is comparable with that of the configuration according to FIG. 4 and again arranged in the external knob 8. The second electrode can be placed in a manner that an accordingly large straying occurs between the two transmitter electrodes. The lock 2, or its cylinder, and the electrodes are formed such that as large a portion of the stray field as possible will be coupled with the transmitter and the receiver (the electronic key 5). The second electrode may be designed and arranged in any desired fashion. Two possible configurations are illustrated in FIG. 5. The second electrode may, for instance, be formed on the internal knob 9 as electrode 13. According to an alternative configuration, the second electrode may be designed as an electrode 14 which is formed by the cylinder housing of the lock 2. Such a transmission array will improve coupling between the lock or cylinder 2 as transmitter and the electronic key 5.

Figure 6:
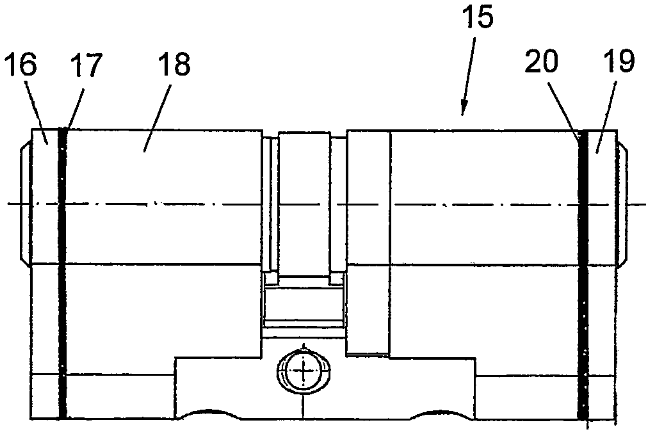

FIG. 6 depicts a further electrode array, in which all of the electrodes are housed within the cylinder 15 of the lock 2 so as to ensure a particularly compact mode of construction. Here, a front portion of the cylinder 15 is designed as an electrode 16 and separated from a further electrode 18 by an insulating layer 17. A further electrode, which is formed by the inner end portion of the cylinder 15 is denoted by 19 and again separated from the electrode 18 by an insulating layer 20. The receiver capacitor 7 in this case is formed either by the electrode pair 16 and 18 or by the electrode pair 18 and 19, depending on which side of the cylinder 15 is approached by the electronic key 5, or the person carrying the electronic key 5. Thereby, the respective electrode 16 or 19 facing the approaching electronic key 5 will as the first electrode be connected with the second electrode 18 to form the receiver capacitor 7. The cylinder 15 may also house electrical assemblies and components such as, e.g., a battery, read-out electronics, evaluation electronics as well as signaling electronics. The electrodes 16 and 19 each may, for instance, be comprised of a sufficiently conductive material such as, e.g. a metal, a sufficiently conductive foil such as, e.g. a metal foil serving as an envelope, a sufficiently conductive coating, a sufficiently conductive varnish, or in any other fashion. Alternatively, a knob may be attached to one or both sides of the locking cylinder 15, which may be conductively connected with the electrode 16 or 19, respectively.

Figure 7:
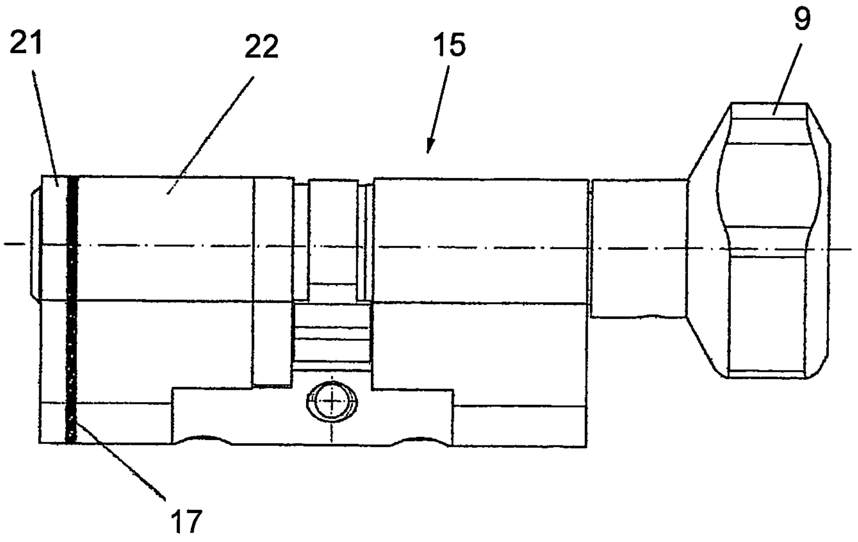

FIG. 7 depicts a further configuration, in which the locking cylinder 15 is only provided with a knob 9 on the room inner side. The first electrode of the receiver and/or transmitter capacitor in this case is denoted by 21, the second electrode is denoted by 22. The internal knob 9 may optionally be connected with the electrode 22.

Figure 8:
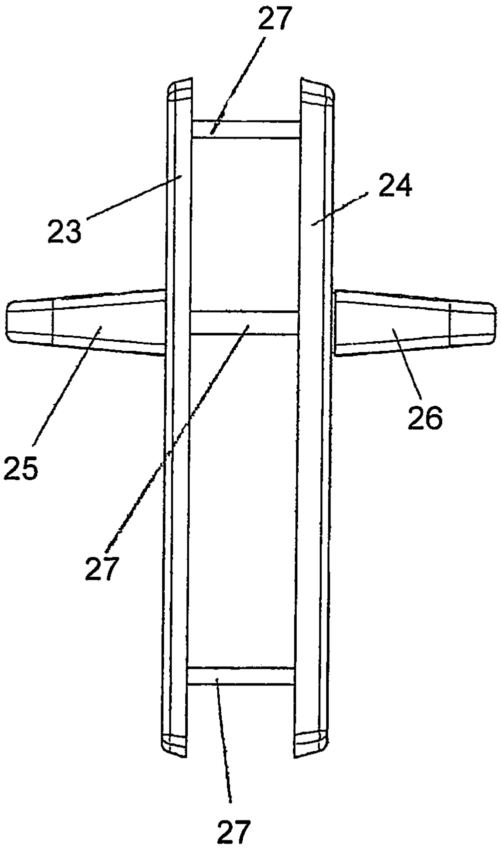

FIG. 8 finally depicts a further electrode array, in which the electrodes are primarily formed in or as fitting parts. In this case, the external and the internal fittings 23 and 24, respectively, each carry a handle 25 and 26, respectively, wherein the room inner-side fitting 24 and the room outer-side fitting 23 are connected by connecting pins 27. The fittings 23 and 24, the handles 25 and 26 and/or the connecting pins 27 may be formed as electrodes or provided with electrodes, wherein it merely has to be taken care that the respectively two electrodes of the receiver or transmitter capacitor are mutually separated by an insulation. An insulation can, for instance, be comprised of the connecting pins 27, with one of the electrodes being arranged in the external fitting 23 and the other one of the electrodes being arranged in the internal fitting 24. Separate insulating layers, which are not illustrated in FIG. 8, may also be provided, for instance, between a door handle and the associated fitting part.

The invention claimed is:

1. An access control device, comprising:

a lock (2) with a locking element, an actuating element (3) for the locking element, an electronic key (5), and an electrical circuit including a receiver unit for receiving key identification data and an evaluation circuit for determining access authorization based on received identification data, said evaluation circuit cooperating with one or more of the actuating element (3) and the locking element for selectively locking or unlocking the lock (2), wherein the electronic key (5) comprises means for generating a capacitive near field via which the identification data is emitted, and a device for coupling the capacitive near field to a person (4) carrying the electronic key (5), the receiver unit of the lock (2) comprises at least two electrodes (10, 11; 16, 18; 18, 19; 21, 22) jointly forming a receiver capacitor (7), at least one of said electrodes forming a capacitive coupling surface such that an alternating current circuit closes at a contact of the lock (2), or at an approach of the lock (2), by said person (4) and an electric flux is created across the lock (2), which is detected by the receiver unit, wherein said electrodes of the receiver capacitor are integrated in the lock, at least one electrode is arranged in a knob of the lock, designed as the knob of the lock, or part of the knob of the lock, and at least one electrode is arranged in a locking cylinder of the lock, designed as the locking cylinder of the lock, or part of the locking cylinder of the lock.

2. An access control device, comprising:

a lock (2) with a locking element, an actuating element (3) for the locking element, an electronic key (5), and an electrical circuit including a receiver unit for receiving key identification data and an evaluation circuit for determining access authorization based on received identification data, said evaluation circuit cooperating with one or more of the actuating element (3) and the locking element for selectively locking or unlocking the lock (2), wherein the electronic key (5) comprises means for generating a capacitive near field via which the identification data is emitted, and a device for coupling the capacitive near field to a person (4) carrying the electronic key (5), the receiver unit of the lock (2) comprises at least two electrodes (10, 11; 16, 18; 18, 19; 21, 22) jointly forming a receiver capacitor (7), at least one of said electrodes forming a capacitive coupling surface such that an alternating current circuit closes at a contact of the lock (2), or at an approach of the lock (2), by said person (4) and an electric flux is created across the lock (2), which is detected by the receiver unit, wherein said electrodes of the receiver capacitor are integrated in the lock, at least one electrode (10, 11) is arranged in a knob (8, 9) of the lock (2), designed as the knob (8, 9), or part of the knob (8, 9), a first electrode is arranged in an exterior knob of the lock, designed as the exterior knob of the lock, or part of the exterior knob of the lock, and a second electrode is formed on an interior knob of the lock.

3. An access control device, comprising:

a lock (2) with a locking element, an actuating element (3) for the locking element, an electronic key (5), and an electrical circuit including a receiver unit for receiving key identification data and an evaluation circuit for determining access authorization based on received identification data, said evaluation circuit cooperating with one or more of the actuating element (3) and the locking element for selectively locking or unlocking the lock (2), wherein the electronic key (5) comprises means for generating a capacitive near field via which the identification data is emitted, and a device for coupling the capacitive near field to a person (4) carrying the electronic key (5), the receiver unit of the lock (2) comprises at least two electrodes (10, 11; 16, 18; 18, 19; 21, 22) jointly forming a receiver capacitor (7), at least one of said electrodes forming a capacitive coupling surface such that an alternating current circuit closes at a contact of the lock (2), or at an approach of the lock (2), by said person (4) and an electric flux is created across the lock (2), which is detected by the receiver unit, wherein said electrodes of the receiver capacitor are integrated in the lock, the device further comprises a transmission device for transmitting data from the lock (2) to the electronic key (5), the transmission device comprises at least two electrodes (10, 11; 16, 18; 18, 19; 21, 22) jointly forming a transmitter capacitor, and the two electrodes of the transmitter capacitor are formed by two axial regions of the locking cylinder of the lock, the two regions being electrically separated from each other by an isolation layer.

4. A device according to claim 3, wherein a knob is connected with one of the two electrodes of the transmitter capacitor.

5. An access control device, comprising:

a lock (2) with a locking element, an actuating element (3) for the locking element, an electronic key (5), and an electrical circuit including a receiver unit for receiving key identification data and an evaluation circuit for determining access authorization based on received identification data, said evaluation circuit cooperating with one or more of the actuating element (3) and the locking element for selectively locking or unlocking the lock (2), wherein the electronic key (5) comprises means for generating a capacitive near field via which the identification data is emitted, and a device for coupling the capacitive near field to a person (4) carrying the electronic key (5), the receiver unit of the lock (2) comprises at least two electrodes (10, 11; 16, 18; 18, 19; 21, 22) jointly forming a receiver capacitor (7), at least one of said electrodes forming a capacitive coupling surface such that an alternating current circuit closes at a contact of the lock (2), or at an approach of the lock (2), by said person (4) and an electric flux is created across the lock (2), which is detected by the receiver unit, wherein said electrodes of the receiver capacitor are integrated in the lock, at least one electrode (16, 18, 19, 21, 22) is arranged in a locking cylinder of the lock (2), designed as the locking cylinder, or part of the locking cylinder, a first electrode is formed by a first end region of the locking cylinder, a second electrode is formed by a second end region of the locking cylinder, which is opposite the first end region, and a third electrode is formed by a middle region of the locking cylinder that is arranged between the first end region and the second end region, wherein the first end region, second end region, and middle region are separated from one another by isolation layers.

6. A device according to claim 5, wherein a knob that is arranged on the locking cylinder is electrically connected to the electrode forming the end region of the locking cylinder.

7. A device according to claim 5, wherein on each side of the locking cylinder a knob is arranged, wherein the knobs are each electrically connected to the adjoining electrode forming end region of the locking cylinder.

8. An access control device, comprising:

a lock (2) with a locking element, an actuating element (3) for the locking element, an electronic key (5), and an electrical circuit including a receiver unit for receiving key identification data and an evaluation circuit for determining access authorization based on received identification data, said evaluation circuit cooperating with one or more of the actuating element (3) and the locking element for selectively locking or unlocking the lock (2), wherein the electronic key (5) comprises means for generating a capacitive near field via which the identification data is emitted, and a device for coupling the capacitive near field to a person (4) carrying the electronic key (5), the receiver unit of the lock (2) comprises at least two electrodes (10, 11; 16, 18; 18, 19; 21, 22) jointly forming a receiver capacitor (7), at least one of said electrodes forming a capacitive coupling surface such that an alternating current circuit closes at a contact of the lock (2), or at an approach of the lock (2), by said person (4) and an electric flux is created across the lock (2), which is detected by the receiver unit, wherein said electrodes of the receiver capacitor are integrated in the lock, at least one electrode is arranged in a fitting (23, 24) of the lock (2), designed as the fitting (23, 24) of the lock (2), or part of the fitting (23, 24) of the lock (2), and said fitting comprising an exterior and an interior fitting each having a handle, wherein the handles are designed as electrodes or are provided with electrodes.

9. An access control device, comprising:

a lock (2) with a locking element, an actuating element (3) for the locking element, an electronic key (5), and an electrical circuit including a receiver unit for receiving key identification data and an evaluation circuit for determining access authorization based on received identification data, said evaluation circuit cooperating with one or more of the actuating element (3) and the locking element for selectively locking or unlocking the lock (2), wherein the electronic key (5) comprises means for generating a capacitive near field via which the identification data is emitted, and a device for coupling the capacitive near field to a person (4) carrying the electronic key (5), the receiver unit of the lock (2) comprises at least two electrodes (10, 11; 16, 18; 18, 19; 21, 22) jointly forming a receiver capacitor (7), at least one of said electrodes forming a capacitive coupling surface such that an alternating current circuit closes at a contact of the lock (2), or at an approach of the lock (2), by said person (4) and an electric flux is created across the lock (2), which is detected by the receiver unit, wherein said electrodes of the receiver capacitor are integrated in the lock, at least one electrode (10, 11) is arranged in a knob (8, 9) of the lock (2), designed as the knob (8, 9), or part of the knob (8, 9), and the lock comprises a fitting, said fitting comprising an exterior and an interior fitting each having a handle, wherein the handles are designed as electrodes or are provided with electrodes.

10. A device according to claim 8, wherein an isolation layer is provided between a handle and the associated fitting part.

11. A device according to claim 9, wherein an isolation layer is provided between a handle and the associated fitting part.

12. An access control device, comprising:

a lock (2) with a locking element, an actuating element (3) for the locking element, an electronic key (5), and an electrical circuit including a receiver unit for receiving key identification data and an evaluation circuit for determining access authorization based on received identification data, said evaluation circuit cooperating with one or more of the actuating element (3) and the locking element for selectively locking or unlocking the lock (2), wherein the electronic key (5) comprises means for generating a capacitive near field via which the identification data is emitted, and a device for coupling the capacitive near field to a person (4) carrying the electronic key (5), the receiver unit of the lock (2) comprises at least two electrodes (10, 11; 16, 18; 18, 19; 21, 22) jointly forming a receiver capacitor (7), at least one of said electrodes forming a capacitive coupling surface such that an alternating current circuit closes at a contact of the lock (2), or at an approach of the lock (2), by said person (4) and an electric flux is created across the lock (2), which is detected by the receiver unit, wherein said electrodes of the receiver capacitor are integrated in the lock, at least one electrode is arranged in a fitting (23, 24) of the lock (2), designed as the fitting (23, 24) of the lock (2), or part of the fitting (23, 24) of the lock (2), and said fitting comprising an exterior fitting and an interior fitting each having a handle, wherein one electrode is arranged in the exterior fitting and another electrode is arranged in the interior fitting.

13. An access control device, comprising:

a lock (2) with a locking element, an actuating element (3) for the locking element, an electronic key (5), and an electrical circuit including a receiver unit for receiving key identification data and an evaluation circuit for determining access authorization based on received identification data, said evaluation circuit cooperating with one or more of the actuating element (3) and the locking element for selectively locking or unlocking the lock (2), wherein the electronic key (5) comprises means for generating a capacitive near field via which the identification data is emitted, and a device for coupling the capacitive near field to a person (4) carrying the electronic key (5), the receiver unit of the lock (2) comprises at least two electrodes (10, 11; 16, 18; 18, 19; 21, 22) jointly forming a receiver capacitor (7), at least one of said electrodes forming a capacitive coupling surface such that an alternating current circuit closes at a contact of the lock (2), or at an approach of the lock (2), by said person (4) and an electric flux is created across the lock (2), which is detected by the receiver unit, wherein said electrodes of the receiver capacitor are integrated in the lock, at least one electrode (10, 11) is arranged in a knob (8, 9) of the lock (2), designed as the knob (8, 9), or part of the knob (8, 9), and the lock comprises a fitting, said fitting comprising an exterior fitting and an interior fitting each having a handle, wherein one electrode is arranged in the exterior fitting and another electrode is arranged in the interior fitting.

14. An access control device, comprising:

a lock (2) with a locking element, an actuating element (3) for the locking element, an electronic key (5), and an electrical circuit including a receiver unit for receiving key identification data and an evaluation circuit for determining access authorization based on received identification data, said evaluation circuit cooperating with one or more of the actuating element (3) and the locking element for selectively locking or unlocking the lock (2), wherein the electronic key (5) comprises means for generating a capacitive near field via which the identification data is emitted, and a device for coupling the capacitive near field to a person (4) carrying the electronic key (5), the receiver unit of the lock (2) comprises at least two electrodes (10, 11; 16, 18; 18, 19; 21, 22) jointly forming a receiver capacitor (7), at least one of said electrodes forming a capacitive coupling surface such that an alternating current circuit closes at a contact of the lock (2), or at an approach of the lock (2), by said person (4) and an electric flux is created across the lock (2), which is detected by the receiver unit, wherein said electrodes of the receiver capacitor are integrated in the lock, and the two electrodes of the receiver capacitor are formed by two axial regions of the locking cylinder of the lock, the two regions being electrically separated from each other by an isolation layer.

* * * * *